Figure 1:
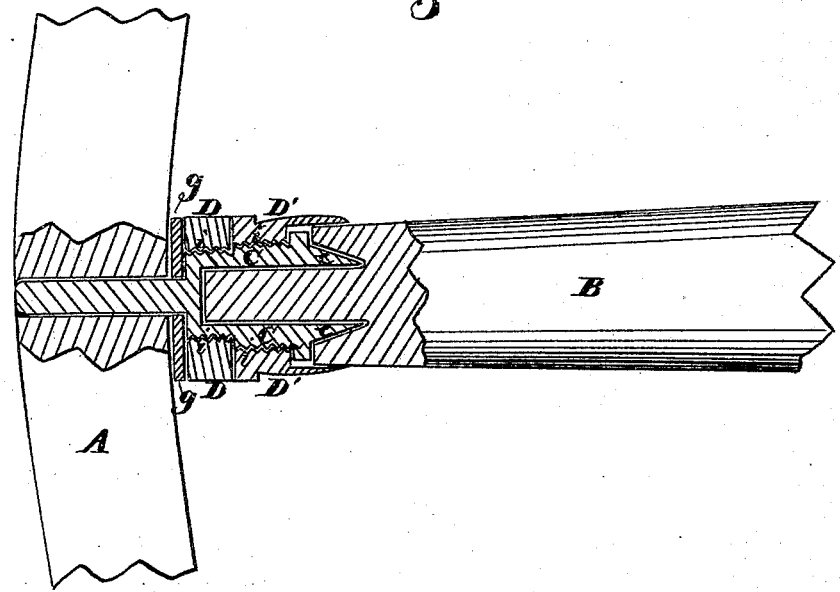

A. J. PACKARD & C. P. HARRIS.
TIRE TIGHTENER.

No. 172,647. Patented Jan. 25, 1876.

Witnesses
Geo. H. Strong.
Jno. L. Boone

Inventors
Charles P. Harris
Adoniram J. Packard
by Dewey
Attys.

UNITED STATES PATENT OFFICE.

ADONIRAM J. PACKARD AND CHARLES P. HARRIS, OF HILL'S FERRY, CAL.

IMPROVEMENT IN TIRE-TIGHTENERS.

Specification forming part of Letters Patent No. 172,647, dated January 25, 1876; application filed November 6, 1875.

*To all whom it may concern:*

Be it known that we, ADONIRAM J. PACKARD and CHARLES P. HARRIS, of Hill's Ferry, Stanislaus county, State of California, have invented a Device for Tightening Tires; and we do hereby declare the following description and accompanying drawings are sufficient to enable any person skilled in the art or science to which it most nearly appertains to make and use our said invention without further invention or experiment.

Our invention relates to an improved device for tightening the tires of vehicles without interfering with their daily use; and it consists in finishing out the spokes by a metal end, having a screw cut upon the outside, and combining therewith devices hereinafter described.

Referring to the accompanying drawings for a more complete explanation of our invention, A is the felly of a wheel, and B is a spoke. The outer end of this spoke is turned down, so as to extend a considerable distance into a socket formed in a metal cap, C, which fits tightly over the end of the spoke, and is provided with extension lugs or points $e\,e$, which penetrate the end of the spoke upon each side of the reduced portion, and thus prevent the cap from twisting or turning when the nuts are moved. The outer end of the cap C also forms a spindle, which passes entirely through the felly to the tire, so as to give great solidity and steadiness. Upon that part of the cap C which lies between the felly and the spoke two sets of screw-threads, $i\,i$, are cut, and two nuts, D D', are fitted to turn upon these threads. The outer of these nuts, D, works against a washer, $g$, which lies between it and the felly.

The inner nut has an extension or shell, which extends down over the point of junction of the spoke and the cap C, and, fitting closely upon the spoke, it not only makes an ornamental finish, but serves to steady the nut when it has been turned outward.

When the wheel is finished the nut will be turned down closely and the tire shrunk to its place. The wheel will then be bound firmly together, and needs no more care until the tire becomes loose.

This always occurs in process of time and by constant use, and it is particularly noticeable in California and countries having long rainless seasons. It occurs most often, and inconveniently, when the vehicle is heavily loaded, and at long distances from any place where it can be repaired in the usual manner, and if not at once mended the wheel will surely break down.

It will now be seen that by simply using a wrench to turn the nuts D D' upon the spokes outward the felly will be forced out, so as to fill the tire and make the whole wheel tight again, the nut D' acting as a jam-nut to hold the outer one to its position, and to prevent any looseness. This gives us a very superior construction, as the part B is actually an extension of the spoke, with which it is perfectly solid. The nuts, when turned outward, give a firm bearing to the felly, and prevent any loosening of the parts.

Having thus described our invention, we do not claim, broadly, the employment of a screw-extension and a nut simply for the spokes of wagon-wheels, as such have been made; but

What we do claim, and desire to secure by Letters Patent, is—

The combination, with the felly A and spoke B, of the socket-extension C of the spoke, having screw-threads $i\,i$ and holding-points $e\,e$, and the nuts D D', all constructed and arranged to operate in the manner substantially as and for the purpose specified.

ADONIRAM JUDSON PACKARD.
CHARLES PARSONS HARRIS.

Witnesses:
J. NEWMAN,
C. M. PERKINS.